US011391493B1

(12) United States Patent
Hasegawa et al.

(10) Patent No.: US 11,391,493 B1
(45) Date of Patent: Jul. 19, 2022

(54) FLEXIBLE OPTICAL SOLAR REFLECTOR HAVING ENHANCED INFRA-RED EMITTANCE USING THIN OXIDE FILMS

(71) Applicant: United States of America as represented by the Administrator of NASA, Washington, DC (US)

(72) Inventors: Mark M. Hasegawa, Highland, MD (US); Kenneth O'Connor, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 844 days.

(21) Appl. No.: 16/135,812

(22) Filed: Sep. 19, 2018

Related U.S. Application Data (60) Provisional application No. 62/574,483, filed on Oct. 19, 2017.

(51) Int. Cl.
*B32B 15/20* (2006.01)
*G02B 1/12* (2006.01)
(Continued)

(52) U.S. Cl.
CPC ........ *F24S 23/82* (2018.05); *B29D 11/00865* (2013.01); *B32B 15/20* (2013.01); *G02B 1/12* (2013.01); *Y10T 428/24967* (2015.01)

(58) Field of Classification Search
CPC ....... Y10T 428/24942; Y10T 484/2495; Y10T 484/24967; Y10T 424/24975; Y10T 428/26; Y10T 428/261; Y10T 428/263; Y10T 428/265; Y10T 428/266; Y10T 428/268; Y10T 428/31678; Y10T 428/31681; Y10T 428/31721; B32B 9/00; B32B 9/008; B32B 9/04; B32B 9/041; B32B 9/045; B32B 15/00; B32B 15/04; B32B 15/043; B32B 15/08; B32B 18/00; B32B 27/00; B32B 27/06; B32B 27/08; B32B 27/28; B32B 27/281; B32B 33/00; B32B 2250/00; B32B 2250/05;
(Continued)

(56) References Cited

U.S. PATENT DOCUMENTS 10,919,268 B1 * 2/2021 Hasegawa ............... B32B 15/08
2014/0113120 A1 * 4/2014 Thiel ................... C03C 17/3621
428/212

(Continued)

*Primary Examiner* — Maria V Ewald
*Assistant Examiner* — Ethan A. Utt
(74) *Attorney, Agent, or Firm* — Matthew F. Johnston; Bryan A. Geurts; Helen M. Galus (57) ABSTRACT

A space-stable thin film composite coating is provided that exhibits high IR emittance properties similar to OSR mirrors, and which is thin enough to be applied to a flexible substrate. The composite coating can include hundreds of alternating layers of aluminum oxide and silicon dioxide vacuum deposited to individual layer thickness of about 150 Angstroms and 50 Angstroms, respectively. The composite coating can be attached to substrates having complex geometries, for example, at various points during integration and production of hardware. The thin film can increase thermal design efficiency, reduce radiator mass and costs, and reduce production time-frames by eliminating the complexity of OSR mirror bonding.

2 Claims, 3 Drawing Sheets

(51) Int. Cl.
  *F24S 23/70* (2018.01)
  *B29D 11/00* (2006.01)
(58) Field of Classification Search
  CPC ............ B32B 2250/42; B32B 2255/00; B32B 2255/06; B32B 2255/10; B32B 2255/20; B32B 2255/205; B32B 2255/28; B32B 2307/00; B32B 2307/40; B32B 2307/412; B32B 2307/416; B32B 2311/02; B32B 2311/08; B32B 2311/22; B32B 2315/00; B32B 2315/02; B32B 2377/00; B32B 2551/00; B32B 2251/08; B32B 2605/00; B32B 2605/006; B32B 2605/18; B32B 17/00; B32B 17/06; B32B 17/061; G02B 1/00; G02B 1/04; G02B 1/10; G02B 1/11; G02B 1/113; G02B 1/115; G02B 1/116; G02B 1/14; G02B 1/16; G02B 13/00; G02B 13/14; G02B 5/00; G02B 5/08; G02B 5/0816; G02B 5/0825; G02B 5/0833; G02B 5/085; G02B 5/0858; G02B 5/0875; B64G 1/00; B64G 1/22; B64G 1/226; B64G 1/46; B64G 1/50; B64G 1/54; B64G 1/58; C03C 17/00; C03C 17/06; C03C 17/09; C03C 17/10; C03C 17/22; C03C 17/23; C03C 17/245; C03C 17/2453; C03C 17/25; C03C 17/253; C03C 17/27; C03C 17/34; C03C 17/3411; C03C 17/3417; C03C 17/3423; C03C 17/36; C03C 17/3602; C03C 17/3605; C03C 17/3607; C03C 17/361; C03C 17/3613; C03C 17/3615; C03C 17/3618; C03C 17/3639; C03C 17/3642; C03C 17/3644; C03C 17/3649; C03C 17/3652; C03C 17/3655; C03C 17/3657; C03C 17/366; C03C 17/3663
  USPC ....... 428/212, 213, 215, 216, 220, 332–338, 428/457, 458, 473.5, 688, 689, 697, 428/699–702; 359/350, 359, 360, 838, 359/839, 868, 869, 870, 871, 883, 884; 106/1.05, 1.18, 1.19, 286.1, 286.2, 286.5, 106/286.7, 286.8, 287.17, 287.18, 287.34; 244/158.1, 171.7, 171.8
  See application file for complete search history.

(56) References Cited

U.S. PATENT DOCUMENTS

2014/0335330 A1\* 11/2014 Bellman ............... C04B 35/597
                                                                428/212
2016/0272537 A1\*  9/2016 Myli ....................... C03C 17/36

\* cited by examiner

FLEXIBLE OPTICAL SOLAR REFLECTOR HAVING ENHANCED INFRA-RED EMITTANCE USING THIN OXIDE FILMS

CROSS-REFERENCE TO RELATED APPLICATION

The present application claims a benefit from U.S. Provisional Patent Application No. 62/574,483, filed Oct. 19, 2017, which is incorporated herein in its entirety by reference.

STATEMENT OF GOVERNMENT INTEREST

The invention described herein was made at least in part by employees of the United States Government and may be manufactured and used by or for the Government of the United States of America for governmental purposes without the payment of any royalties thereon or therefor.

FIELD OF THE INVENTION

The present invention relates to composite coatings that exhibit low solar absorptance and high infra-red emittance.

BACKGROUND OF THE INVENTION

A great deal of the temperature control of spacecraft relies on the ability of external coatings to radiate and reflect energy to and from the spacecraft. The solar absorptance (a) and IR emittance (c) properties of the coatings describe the characteristics to absorb energy from the sun and reject energy in the IR, respectively. The values of these material properties are fractional with the perfect absorber having a value of 1 and the perfect reflector having the value of 0. The solar absorptance is typically measured over the energy wavelengths that the sun irradiates; mostly from 250 nm to 2,500 nm. From Kirchoff's Law, the IR emittance is equal to absorptance of the coating over the wavelength range of the blackbody emitter. At room temperature, the vast majority of the irradiated black body energy is over the range from 3.5 to 40 microns. For spacecraft radiators, the solar absorptance is desired to be low with the IR emittance remaining high. A variety of materials exist that have been used as radiator coatings including white paints, mirrors, and thin film coatings.

Coatings with high performance, stable, optically radiative properties (i.e., low solar absorptance and high IR emittance) have been the focus of much developmental effort. Currently, the highest performing of such systems are optical solar reflector (OSR) mirrors that are made from a 75 micron or greater glass pane, coated with silver. These systems are costly, fragile, and must be bonded to flat/planar surfaces. They are difficult to cut, difficult to customize to curved surfaces, and are heavy. Their maximum IR emittances are typically between 0.80 and 0.86, the emissivity being the ratio of the thermal radiation from the surface to the radiation from an ideal black surface at the same temperature, as given by the Stefan-Boltzmann law.

Optical solar reflectors (OSR) mirrors are commonly applied to spacecraft throughout the aerospace industry. They have extremely low solar absorptances, nearing 0.05, with IR emittances at or above 0.80. Their construction contains a silver backed, cerium doped borosilicate glass with a set of thin films on their outermost surface to increase UV reflectance near the exterior surfaces (MUVR). This reflective thin film yields a reflectance spectrum that has greatly reduced UV adsorption. Emittances of OSR mirrors are approximately 0.80 to 0.86 depending upon the type of glass and the first surface thin film coating. These mirrors are typically rigid and are applied in a bonding process using a paste adhesive and a patterned layout. Costs vary depending on base materials with processing can be as high as $30 a square inch for a flat pattern of material. Breakage also occurs as these are mirrors are fragile and require care during handling, installation, cleaning, and associated I&T operations nearby.

The advantages of OSR include: (1) an extremely low a/e ratio of 0.05/0.80; (2) stability in most space environments; (3) a space flight heritage history; and (4) established processing methods. The disadvantages are: (1) a high cost (>$30/sq. inch); (2) they are fragile and prone to breakage; (3) they can be applied only to flat surfaces; and (4) they can only be applied in regular shapes (squares, rectangles) having rigid flat patterns.

Other radiative coating options include sprayable white coatings that have higher IR emittances, compared with OSR technology, and that can be applied to complex geometries; however, their pigment constituents are not normally as optically stable as OSR systems and can relatively quickly degrade to the point of exhibiting solar absorptances as high as 0.40 when exposed to ultraviolet (UV) radiation and electromagnetic radiation-prone environments. Additionally, white sprayable coatings that have low surface resistivities, e.g., of less than 1E6 ohm/square, have neither low solar absorptances nor optical stability in charging environments.

Silver-backed Teflon systems (Ag/FEP systems) may exhibit good optical properties but the material is not stable in electromagnetic radiation-prone environments. Ag/FEP systems can also be easily damaged during application and are significantly heavy. In addition, Ag/FEP systems that have a conductive layer are extremely prone to damage and loss of conductivity due to mere contact.

In view of the fact that OSR mirrors cannot be bonded to non-flat surfaces, silver-backed Teflon tape is not stable in radiation-prone environments, and white silicate coatings cannot be applied outside of a piece part level during manufacturing and are difficult to repair, a need exists for an improved mirror system that overcomes these problems.

Thin oxide film coatings, including previous composite coatings developed by NASA, have achieved upper bound emittance values of 0.70 when using a combination of a single aluminum oxide ($Al_2O_3$ or alumina) layer and a single silicon dioxide ($SiO_2$ or silica) layer. It has been, however, that increasing thicknesses of the single component oxide layers does not increase emittance but instead decreases structural stability and increases coating surface stresses. The use of these materials, in existing forms, includes single thick layers of alumina and silica and cannot render a higher emittance value.

The Goddard Composite Coating with a silver base, commonly known as CCAg, was established at GSFC in the mid 1970's and has had significant heritage on flight hardware as a low absorbing heat rejection surface. The typical solar absorptance and IR emittance properties are 0.09 and 0.65-0.70 respectively, depending upon the surface roughness of the substrate. The rougher the substrate, the higher the solar absorptance. It can be applied on a variety of substrates including films and rigid metal surfaces. Films coated with a highly stressed CCAg coating, however, tend to roll up upon the oxide coated side of the film.

The CCAg coating is deposited on a substrate using the following compositions and amounts: (1) first, approximately 800 Angstroms (Å) of aluminum oxide is applied to the substrate as a tie layer; (2) then a 1,200 Å layer of silver (or aluminum) is deposited to act as a reflector layer for the solar spectrum; (3) then a layer of 16,000-19,000 Å of aluminum oxide is deposited; (4) then a layer of 5,000-7,500 Å of silicon oxide is deposited; and (5) then a layer of less than 100 Å of Indium Tin Oxide (ITO) is deposited. This yields a coating that is well adhering, has an opaque silver layer, and has an emittance near its maximum without developing an overly stressful coating, and has a conductive oxide topcoat (ITO). This particular combination has been used on a number of legacy programs and existing, new programs on both rigid hardware or as an adhesive backed tape. The CCAg/ITO on a 2 mil thick Kapton HN film can be used as the exterior layer of a composite layup and processed as a normal composite system with vacuum bagging and autoclave. Production costs for a standard CCAg/ITO film on Kapton HN include 50 hours of labor, plus film costs, and for 15 square feet of material the approximate cost is just less than $3.50 per square inch.

The advantages of CCAg include: (1) a modest a/e ratio of 0.09/0.71; (2) an applicability directly to hardware (line of sight) or to flexible film; (3) the ability to be applied to curved objects or complex patterns; (4) a simplified application process for a composite; (5) a Space Flight Heritage history; and (6) a relatively low cost for the film (less than $3.50 per square inch). The disadvantages are that the emittance is limited to 0.72 or below and the material is UV adsorbing.

SUMMARY OF THE INVENTION

The present invention provides a thin, multilayer alumina and silica-based coating comprising vacuum deposited metal and oxide layers including 50 or more alternating thin layers of alumina and silica. The composite coating exhibits an improved infra-red (IR) emittance performance compared with composite coatings that instead comprise a single, thicker alumina layer and a single, thicker silica layer. The improved IR emittance is attained without any significant impact to solar absorptance. The thin layered structure provides a thin film coating that can be applied to a flexible substrate and that rivals or exceeds the optical properties of glass mirrors commonly known as optical solar reflectors (OSR). The thin film structure of the composite coating enables deposition on flexible or rigid substrates and the flexibility to be applied to any number of non-flat configurations that would preclude the use of an OSR mirror.

Manufacturing such coatings and mirrors can be carried out in existing deposition chambers and enable low-cost fabrication. The deposition technique can result in a reduction in cost compared to that for existing OSR mirrors, enable coating complex surfaces that cannot be coated with existing mirror systems, and enable deposition on flexible substrates such as exterior surfaces of multi-layer insulation (MLI) blankets. The materials are suitable for space flight use and exhibit high stability in on-orbit environments.

BRIEF DESCRIPTION OF THE DRAWINGS

The present invention can be even more fully understood with the reference to the accompanying drawings which are intended to illustrate, not limit, the present invention.

DETAILED DESCRIPTION OF THE INVENTION

According to various embodiments of the present invention, the coating comprises a base layer, a reflective layer, a plurality of aluminum oxide layers, a plurality of silicon dioxide layers wherein at least some of the silicon dioxide layers are disposed between some of the aluminum oxide layers, and a protective outer layer. The silicon dioxide layers and the aluminum oxide layers can be alternately arranged, for example, such that each silicon dioxide layer is disposed adjacent to, and between, two aluminum oxide layers, and each of the aluminum oxide layers is disposed adjacent to, and between, two silicon dioxide layers, with the exception of an innermost layer and an outermost layer. The reflective layer can comprise a silver-containing material, a layer of silver, another reflective metal, or the like. The aluminum oxide layers and the silicon dioxide layers can be built or deposited on top of the reflective layer.

Herein, what is meant by aluminum oxide is $Al_2O_3$. Herein, what is meant by silicon dioxide is silicon oxide of the formula $SiO_x$ wherein x is from about 1 to about 4, most commonly, about 2. As is known in the art of silicon oxide chemistry, not every silicon atom of the silicon dioxide layer may be bonded to two oxygen atoms, but, instead, some silicon atoms of the silicon dioxide layer can be bonded to one, three, or four oxygen atoms. For the most part, however, the silicon atoms of the silicon dioxide layer are bonded to two oxygen atoms such that, in the formula $SiO_x$, the value for x is about two. Moreover, the term "silicon oxide," as used herein, also refers to silicon oxide of the formula $SiO_x$.

For the most part, aluminum oxide and silicon oxides are stable materials that change slightly in the space environment. The materials can be vacuum deposited with the oxides being deposited, for example, by electron beam assisted physical vapor deposition.

Figure 1:
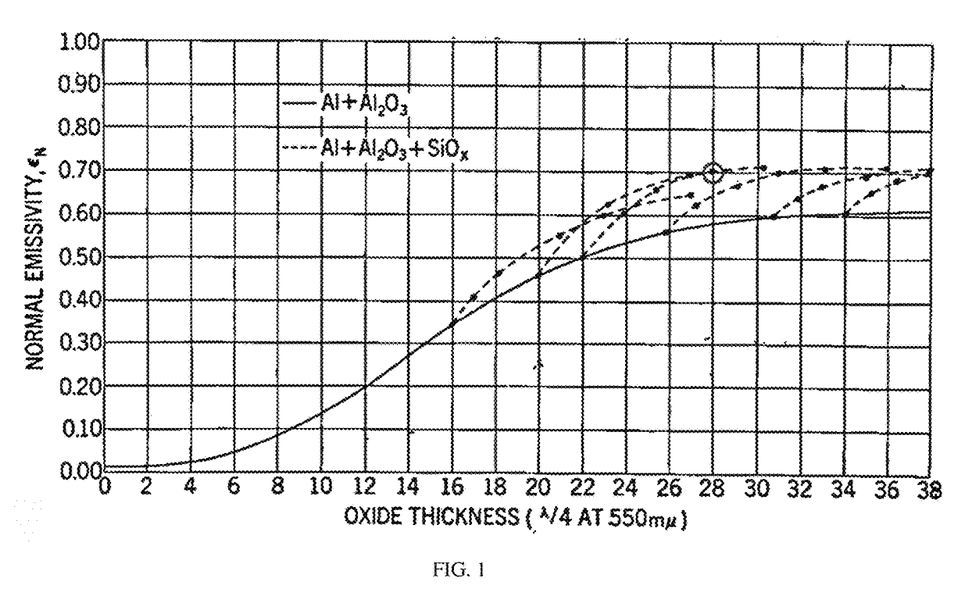
FIG. 1 is a graph showing the relationship between the thickness of various oxide layers with respect to the IR emittance of a final composite coating that includes such layers.

FIG. 1 is a graph showing the relationship between the thickness of various oxide coatings (aluminum oxide and silicon oxide layers) with respect to the IR emittance of the final system. Quarter waves at 550 nanometers equate to 832 Å of aluminum oxide and 928 Å for silicon. So, a layered system with 22% waves of aluminum oxide and 6% waves of silicon would be equal to 18,304 Å and 5,568 Å, respectively which is shown as the circled dot on the graph.

The emittance data appear to plateau at close to 0.71-0.72 despite increasing the film thickness. It has been demonstrated that the thicker these films go and the quicker the deposition, the higher the internal stresses that exist in the coating and the greater likelihood that the coating will exhibit adhesion failures.

Figure 2:
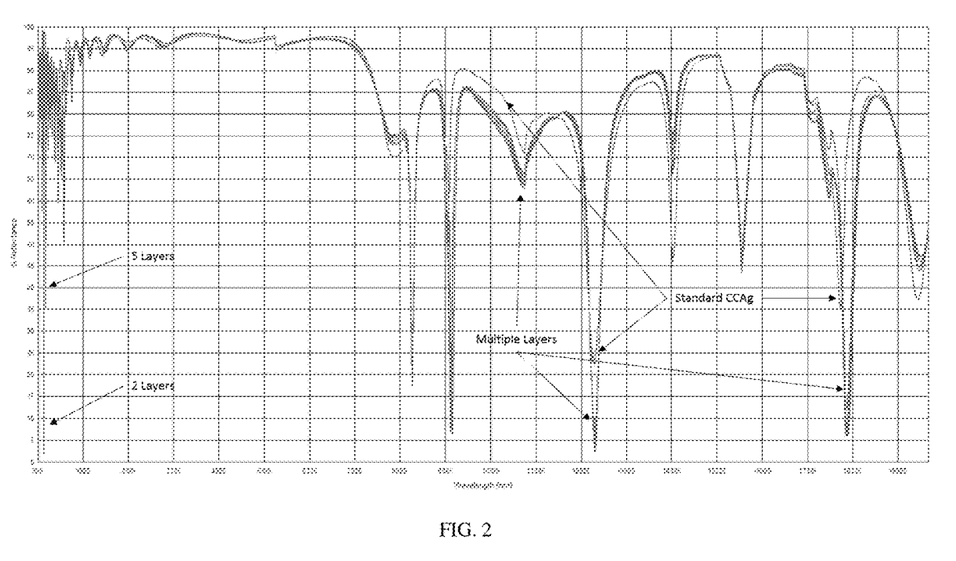
FIG. 2 is a graph showing certain regions of the IR spectrum where absorptance is greater for multi-layered systems (a lower % of reflectance) when compared with the absorptance of standard CCAg material systems.

The present invention relates to a new, multilayered CCAg System, comprising a multilayered oxide film but composed of the same materials as existing CCAg systems. The multiple coats are considerably thinner and in greater numbers and induce thin film interference properties to increase absorption in the IR bands. FIG. 2 shows that certain regions where the absorptance in the IR spectrum is greater for multilayered systems when compared with standard CCAg material systems. The multilayered system exhibits generally lower reflectance data.

The coating can be disposed on a substrate and the substrate can first be coated with a base layer. The base layer can be configured, composed, or both, so as to receive the reflective layer and bond the coating to the substrate. An exemplary base layer material is nickel chromium (NiCr) although other base layer materials can be used.

The reflective layer can have any suitable thickness, for example, a thickness that provides a mirror coating. The reflective layer can comprise pure silver, pure aluminum, pure chromium, pure titanium, another highly reflective metal, a highly reflective alloy, or the like. In an exemplary embodiment, the reflective layer has a thickness of from about 100 Å to about 5,000 Å, for example, from about 500 Å to about 3,000 Å, from about 1,000 Å to about 2,000 Å, from about 1,100 Å to about 1,500 Å, or of about 1,200 Å.

Each of the plurality of aluminum oxide layers can have a thickness of 500 Å or less, for example, 250 Å or less, 200 Å or less, or a thickness of about 150 Å. Each of the plurality of silicon dioxide layers can have a thickness of 200 Å or less, for example, 100 Å or less, or a thickness of about 50 Å. In exemplary embodiments, the coating comprises at least 50 layers of aluminum oxide, with each layer having a thickness of about 500 Å or less. The plurality of aluminum oxide layers can comprise at least 60 layers, at least 70 layers, at least 80 layers, at least 90 layers, or at least 100 layers, for example, about 80 layers. The plurality of silicon dioxide layers can comprise at least 50 layers, at least 60 layers, at least 70 layers, at least 80 layers, at least 90 layers, or at least 100 layers, for example, about 80 layers.

According to various embodiments of the present invention, the composite coating can comprise at least 50 alternating layers of silica and alumina, for example, at least 75 alternating layers, at least 100 alternating layers, at least 125 alternating layers, at least 150 alternating layers, at least 175 alternating layers, or at least 200 alternating layers. Each of the alumina layers can have a thickness of from 50 Å to 500 Å or more, for example, from 70 Å to 400 Å, from 90 Å to 300 Å, from 100 Å to 200 Å, or from 125 Å to 175 Å. Each of the silica layers can have a thickness of from 20 Å to 200 Å or more, for example, from 30 Å to 100 Å, from 40 Å to 80 Å, or from 45 Å to 60 Å.

In an exemplary embodiment the plurality of layers of aluminum oxide comprises about 80 layers of aluminum oxide, each having a thickness of amount 150 Å, and the plurality of layers silicon dioxide comprises about 80 layers, each having a thickness of about 50 Å, wherein the layers of silicon dioxide are arranged alternately with the layers of aluminum oxide. Such a coating can also be provided with a protective outer layer comprising indium tin oxide, a reflective silver layer, and a base layer comprising nickel chromium.

The number of layers of aluminum oxide and the thickness of each layer can be formulated such that the total thickness of all the aluminum oxide layers together equals from about 5,000 Å to about 20,000 Å, for example, from about 8,000 Å to about 16,000 Å, from about 10,000 Å to about 15,000 Å, from about 11,000 Å to about 13,000 Å, or about 12,000 Å. The total number of silicon dioxide layers and the thickness of each can be formulated such that the total thickness of all the silicon dioxide layers together equals from about 1,000 Å to about 10,000 Å, for example, from about 2,000 Å to about 6,000 Å, from about 3,000 Å to about 5,000 Å, or about 4,000 Å.

Among the alternating thin layers of aluminum oxide and silicon dioxide, one or more layers of titanium dioxide ($TiO_x$) can be included, where x is about 2 or 2. The one or more layers of titanium dioxide can be included in addition to, rather than as a replacement for, the aluminum oxide and silicon-dioxide layers. The titanium dioxide layer or layers can be provided each at a thickness of from about 50 Å to about 500 Å, for example, from about 75 Å to about 400 Å or from about 100 Å to about 300 Å.

The coating can comprise a protective outer layer, for example, a transparent metal oxide layer such as an indium tin oxide layer, a borosilicate glass layer, or the like. The protective outer layer can have a thickness of from about 20 Å to about 500 Å, from about 50 Å to about 200 Å, from about 75 Å to about 150 Å, of about 100 Å, or of any other suitable thickness. The protective outer layer can be thin enough to be flexible and transparent, yet thick enough to adequately protect the underlying aluminum oxide and silicon dioxide layers.

According to various embodiments, the outer layer is conductive. Indium tin oxide can be used as a conductive outer layer. The outer layer can also include gold. Gold can be incorporated into the outer layer, dispersed throughout, or as a separate layer. The outer layer can comprise an indium tin oxide or other conductive layer and a thin layer of gold, for example, a resonator layer made of gold. The gold layer can be the outermost layer. A good layer can be deposited by any suitable technique, for example, by an atomic layer deposition method. The gold layer can be very thin, for example, from about 5 Å to about 10 Å, for example, having a single gold atom thickness.

Substrates that can be coated with the coating of the present invention can include spacecraft surfaces, spacecraft panels, solar panels, optical solar reflectors, blankets, multi-layer insulation blankets, and the like. In some embodiments, the coating can be applied to a blanket and the blanket can then be used to cover a substrate such as a panel, a planar panel, a reflector, or the like.

The composite coating of the present invention can include common materials used in earlier versions of NASA composite coatings but are vacuum deposited and of such a structure as to significantly increase the IR emittance of the coating without increasing the overall weight and size of the system. The composite coating rivals or exceeds radiative properties of optical solar reflector (OSR) mirrors. The composite coating can be applied to flexible substrates, such as Kapton HN or Kapton DR, that can then be attached to a variety of shapes and configurations of hardware or can be used as stand-alone films for such things as MLI blankets. The materials used in the composite coating may bleed some amount of charge and can be used with a conductive transparent coating, such as indium tin oxide, to bleed all surface charge to a grounding point. A suitable grounding point can comprise an underlying conductive substrate or another conductive point along the surface of the coating.

An exemplary composite coating according to the present invention can comprise films of vacuum deposited metals and oxides in the following order, from the substrate to the outermost layer. The thicknesses shown below can be exact or approximate values, with approximate meaning that the thickness shown can deviate by plus or minus 0% to 25%. The aluminum oxide and silicon dioxide layers alternate. The units of measurements are Angstroms (Å).

NiChrome (500 Å)
Silver (1200 Å)

Aluminum Oxide (150 Å, 12000 Å total)
Silicon Dioxide (50 Å, 4000 Å total)
Indium Tin Oxide (100 Å)

As can be seen from the order shown, a 500 Å layer of nickel chromium (NiCr) is first vacuum deposited on a substrate, followed by a 1200 Å layer of silver. Then what is vacuum deposited is a 150 Å layer of aluminum oxide followed by a 50 Å layer of silicon dioxide, followed by another 150 Å layer of aluminum oxide, followed by another 50 Å layer of silicon dioxide, and so on, until 80 layers each of aluminum oxide (at 150 Å per layer) and silicon dioxide (at 50 Å per layer) are alternatingly vacuum deposited. In total, the 80 layers of aluminum oxide have a collective thickness of 12,000 Å and the 80 layers of silicon dioxide have a collective thickness of 4,000 Å. After the 160 alternating layers are deposited, a single, outermost layer of indium tin oxide is deposited to a thickness of 100 Å.

Optical modeling using commonly available software that is publicly available can be used to determine suitable or optical constraints for refractive index (n) properties, extinction coefficients (k), and complex refractive indices including n and k. These optical constraints can be modeled for alumina, silica, titania, and gold, such that the multiple layers of stacked oxide films can exhibit increased IR emittance of the composite coating, through optical interactions. Exemplary optical modeling software that can be used includes FilmStar Optical Thin Film Software available from FTG Software Associates of Princeton, N.J. and Tokyo, Japan. The hundreds of layers of alternating oxides can provide a film that has limited impact on solar absorptance but has an extremely sharp and contiguous absorption band across the IR spectrum, including the absorption band commonly associated with heat transport for spacecraft thermal designs near room temperature. Structures having at least about 150 layers of alternating alumina and silica, with each alumina layer having a thickness of about 150 Å and each silica layer having a thickness of about 50 Å, can provide improvements in IR emittance well above the 0.80 level that represents the current state of the art value for OSR mirrors. At the same time, the structure exhibits limited impact to solar absorption, and additional layers of thin film titania and gold can be incorporated to further improve overall IR emittance. These enhancements can be incorporated into existing coatings deposition processes to result in a low cost, optimized coating on a flexible film.

A five-layer structure as shown above can also be provided, having only one layer of alumina and one layer of silica, as a silver-containing composite coating (CCAg) having a total thickness of 22,500 Å. The coating can be applied to flexible substrates as well as rigid systems and is applicable to a variety of spaceflight hardware that cannot be coated with OSR mirrors. The IR emittance of such a CCAg, however, is only at or slightly above 0.63.

Composite coatings according to various embodiments comprising alternating and multiple aluminum oxide and silicon oxide layers can be produced on flexible polyimide films, for example, Kapton films and substrates, Kapton DR films and substrates, and Kapton HN films and substrates available from E.I. du Pont de Nemours and Company, Wilmington, Del. The composite coating can be formulated to yield emittance values of 0.78 when formed to be 3.2 microns (32,000 A) thick on a Kapton HN substrate. At more typically composite coating thicknesses, for example, of approximately 24,000 A, the modified multilayer coating can exhibit an emittance of 0.73, compared with a typical composite coating, having one layer each of aluminum oxide and silicon oxide, that would exhibit an emittance of approximately 0.63. The composite coating can be deposited onto a conductive substrate, such as Kapton DR or another polyimide-based conductive film or substrate.

Each of the layers can be deposited independently by any manner known to those of skill in the art, including by the use of electron beams, vacuum environments, oxygen environments, sputtering techniques, resistive coating techniques, and the like. Electron bean deposition techniques can be used, for example, to deposit the aluminum oxide layers and can also be used to deposit other layers, for example, in a vacuum environment or in an oxygen gas ($O_2$) environment. The metal of the reflective layer, for example, silver, can be sputtered, electron beam-deposited in a vacuum, or deposited by a resistance technique wherein the metal of the reflective layer is, for example, initially disposed in a tungsten boat. By running a current through the boat, the reflective layer metal can be heated to the point of sublimation and/or evaporation with the resultant vapor phase material being deposited to form a thin layer. The ITO layer can be sputtered or deposited by using an electron beam in a vacuum. In some embodiments the silicon dioxide layer can be formed by depositing a silicon monoxide (SiO) material in an oxygen ($O_2$) containing environment such that a resultant layer of $SiO_2$ is formed. Other techniques can also, or instead, be used, as are known to those of skill in the art.

The composite coating can be manufactured as a thin film having an adhesive backing and can be repaired and replaced easily on hardware without any complex bonding steps. The composite coating can be made into a structure that exhibits only 35%, 42%, or 50%, respectively, of the mass of an OSR mirror, silver Teflon tape at a 5 mil thickness, or typical silicate paint. The composite coating can be produced at a 2018 cost of approximately $3.50 per square inch whereas the 2018 cost of production of an OSR mirror of similar coverage area would be approximately 6 to 8 times as expensive. This cost savings can be significant given that normal spacecraft have up to 30,000 square inches of OSR mirrors on radiator panels. The composite coating can be used on thermal hardware and can replace OSR mirrors, silver Teflon tape, and white thermal paints where such materials are used on private and commercial spacecraft, spacesuits, and blankets.

According to the present invention, improvements are made in the material system by repeating the material system layers ($Al_2O_3$ and $SiO_2$) and decreasing their thicknesses. Table 1 below shows runs for a system that repeats each of these oxide layers five times as compared to the standard CCAg which has a single layer of each oxide. The samples were fabricated to determine if the IR emittance could be increased. The samples were Kapton film that initially had silver and aluminum oxide applied as the first layer, then inserted onto varying angled brackets that would turn about RESTORE Conduit deposition ground support equipment during the aluminum oxide and silicon dioxide runs for the conduit. After the deposition, the samples were removed, and IR emittances were taken. This deposition was repeated with a serial buildup of oxide sets. There were two tests attempted in this manner. Later, the amount of deposition was established using the transmission of aluminum deposited onto glass slides mounted on the same fixtures. The results of these serial depositions indicated that the emittance could reach as high as 0.78 with four layers of fairly significant thicknesses.

TABLE 1

| | | | Thickness in Angstroms | | | | | | | |
|---|---|---|---|---|---|---|---|---|---|---|
| Sample | | Run 1 | Run 2 | | Run 3 | | Run 4 | | Total Oxide |
| Number | eN | t(Al2O3) | t(Al2O3) | t(SiO2) | t(Al2O3) | t(SiO2) | t(Al2O3) | t(SiO2) | Thickness |
| Run 1 | 1 | 0.28 | 11913 | | | | | | | 11913 |
| | 2 | 0.23 | 10717 | | | | | | | 10717 |
| | 3 | 0.18 | 9472 | | | | | | | 9472 |
| | 4 | 0.17 | 9361 | | | | | | | 9361 |
| Run 2 | 1 | 0.63 | | 4765 | 4765 | | | | | 21443 |
| | 2 | 0.58 | | 4287 | 4287 | | | | | 19291 |
| | 3 | 0.49 | | 3789 | 3789 | | | | | 17050 |
| | 4 | 0.48 | | 3744 | 3744 | | | | | 16850 |
| Run 3 | 1 | 0.77 | | | | 4765 | 4765 | | | 30974 |
| | 2 | 0.76 | | | | 4287 | 4287 | | | 27865 |
| | 3 | 0.73 | | | | 3789 | 3789 | | | 24628 |
| | 4 | 0.71 | | | | 3744 | 3744 | | | 24339 |
| Run 4 | 1 | 0.77 | | | | | | 4765 | 4765 | 40504 |
| | 2 | 0.78 | | | | | | 4287 | 4287 | 36439 |
| | 3 | 0.78 | | | | | | 3789 | 3789 | 32206 |
| | 4 | 0.77 | | | | | | 3744 | 3744 | 31828 |

Sample number 1 in Run 2 is effectively the same as a standard CCAg run with slightly less than optimal silicon oxide thicknesses (16,687 Å of Al$_2$O$_3$ and 4,765 Å of SiO$_2$) with an emittance of 0.63. A third and fourth paired layer of oxides results in an increased emittance of 0.78 at slightly over 3 microns in thickness.

Figure 3:
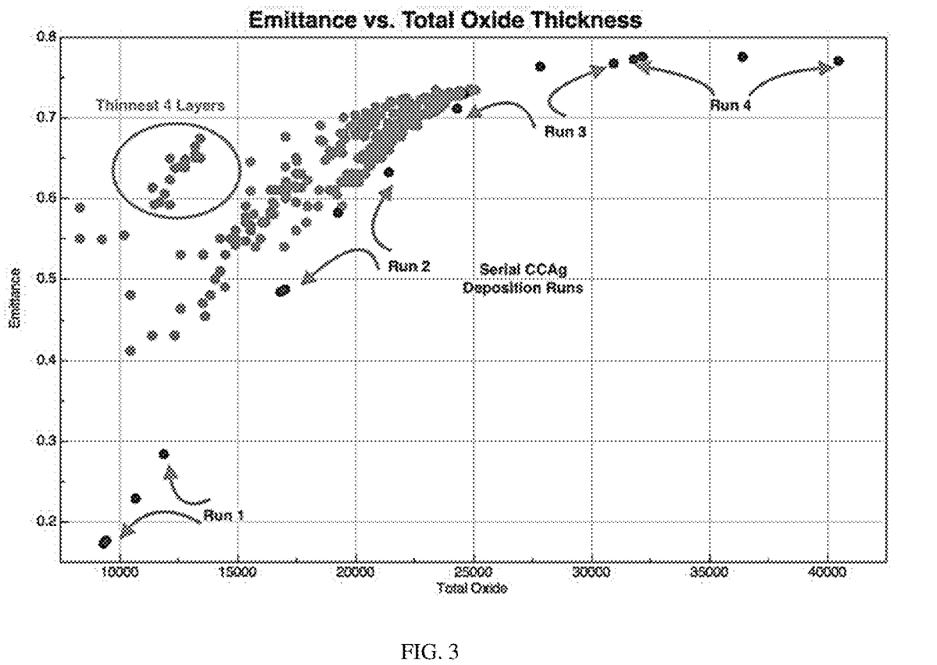
FIG. 3 is a graph showing 288 plotted datapoints each corresponding to a sample generated and having the layer types and total oxide thickness shown and the corresponding emittance ratio exhibited by the coating.

A second set of experiments were conducted to vary the initial amount of Al$_2$O$_3$ applied during Run 1 and to change the paired oxide depositions. This work was carried out using a drum deposition test setup, specifically designed for CCAg application to films. The CCAg was applied to 2 and 3 mil thick Kapton HN films and had four consecutive paired depositions of Al$_2$O$_3$ and SiO$_2$ after an initial deposition of Al$_2$O$_3$. The maximum deposition of the initial Al$_2$O$_3$ was nearly 7,650 Å with a minimum of 2,540 Å. Paired oxide depositions ranged from 1,089 Å to 3,327 Å for Al$_2$O$_3$ and from 363 Å to 1,092 Å for SiO$_2$. A total of 288 samples were generated for this test, and the results of their emittances with total oxide thickness are shown in FIG. 3. Additionally, the data from the first test run are also shown in FIG. 3, represented by the darkest dots and denoted by their run number.

The area in the oval represents the samples with the thinnest paired oxide layers in the four paired layer data set. They show significantly high emittances (greater than 0.60) at total oxide thicknesses less than 15,000 Å. These samples indicate that thin, multilayered systems can achieve increased emittance properties as the number of layers increases despite having much less bulk oxide material than standard CCAg or other multilayered systems. The overall oxide thickness can be reduced to thereby reduce the inherent stresses within the films. It has been observed that the thicker the oxide layer, the greater the stress within the film and the more likely that debonding and structural problems would occur within the film. The films of the present invention have improved heat rejection properties over existing CCAg products and improved durability and applicability to hardware.

The present invention also combines the multilayered CCAg approach with an UV reflective multilayered effort to yield a system that performs near the MUVR OSR systems ($\alpha/\varepsilon$<0.06/0.80), but at a greatly reduced cost and with reduced processing complexity. The coating, when applied to a film system such as Kapton HN, offers better coverage than OSRs on complex (non-rectangular) shapes and areas, and can be cut or trimmed to complex shapes to account for penetrations, corner edges, fillets, and the like, that occur on underlying structures. The material can be applied in complete sheets and can eliminate any needed gaps that would otherwise be required between individual OSR mirrors.

The entire contents of all references cited in this disclosure are incorporated herein in their entireties, by reference. Herein, the term "about" means within a range of from plus 5% to minus 5% the value modified. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A coating consisting essentially of a reflective layer, a plurality of aluminum oxide (Al2O3) layers, a plurality of silicon dioxide (SiO2) layers, and a protective outer layer and abase layer, wherein the protective outer layer comprises indium tin oxide, and the base layer comprises nickel chromium (NiCr), wherein the plurality of layers of aluminum oxide comprises about 80 layers of aluminum oxide, and each layer of aluminum oxide has a thickness of about 150 Å, and the plurality of layers of silicon dioxide comprises about 80 layers of silicon dioxide, alternately arranged with respect to the plurality of layers of aluminum oxide, and each layer of silicon dioxide has a thickness of about 50 Å, and said coating having an IR emittance of at least 0.78 with an overall thickness of about 3.2 microns.

2. A spacecraft comprising a coated substrate, wherein the coated substrate comprises the coating of claim 1.

* * * * *